US009346308B2

(12) United States Patent
Lind et al.

(10) Patent No.: US 9,346,308 B2
(45) Date of Patent: May 24, 2016

(54) BOOKLET GUIDE AND CLAMP SYSTEM IN A BOOKLET PROCESSING MECHANISM

(71) Applicant: DATACARD CORPORATION, Minnetonka, MN (US)

(72) Inventors: Michael Lind, Minneapolis, MN (US); Gary Schultze, Savage, MN (US); Dennis J. Warwick, Richfield, MN (US)

(73) Assignee: ENTRUST DATACARD CORPORATION, Shakopee, MN (US)

( * ) Notice: Subject to any disclaimer, the term of this patent is extended or adjusted under 35 U.S.C. 154(b) by 281 days.

(21) Appl. No.: 13/974,126

(22) Filed: Aug. 23, 2013

(65) Prior Publication Data

US 2014/0056680 A1 Feb. 27, 2014

Related U.S. Application Data

(60) Provisional application No. 61/692,975, filed on Aug. 24, 2012.

(51) Int. Cl.

| | |
|---|---|
| ***B65G 47/22*** | (2006.01) |
| ***B42C 99/00*** | (2006.01) |
| ***B42D 9/06*** | (2006.01) |

(Continued)

(52) U.S. Cl.
CPC . *B42C 99/00* (2013.01); *B42D 9/06* (2013.01); *B42D 25/24* (2014.10); *B42D 25/41* (2014.10)

(58) Field of Classification Search
CPC .......... B42C 99/00; B42D 9/06; B42D 9/005; B42D 25/24; B42D 25/41; B25B 1/04; B25B 1/2468; B25B 11/02
USPC ........ 414/737, 777, 779, 783, 784; 270/52.25
See application file for complete search history.

(56) References Cited

U.S. PATENT DOCUMENTS 4,231,466 A * 11/1980 Rathert .................... 198/803.7
5,114,293 A 5/1992 Rathert (Continued)

FOREIGN PATENT DOCUMENTS

JP 2007-216682 2/2011
WO WO 01/54918 * 8/2001 ............ B42D 15/10

OTHER PUBLICATIONS

U.S. Appl. No. 61/692,973, entitled “Booklet Spine Guidance System in a Booklet Processing Mechanism”, filed Aug. 24, 2012.

(Continued)

*Primary Examiner* — Saul Rodriguez
*Assistant Examiner* — Lynn Schwenning
(74) *Attorney, Agent, or Firm* — Hamre, Schumann, Mueller & Larson, P.C.

(57) ABSTRACT

A booklet processing mechanism is described that includes a booklet guide and clamp system that is configured to act as the guide during entry and exit of the booklet into and from the mechanism, as well as clamp and hold the booklet in its proper position during a processing operation, for example by a laser or during vision verification. The booklet guide and clamp system is moveable between a first position for guiding an upper, free edge of an opened booklet and a second position where the upper, free edge is clamped against a backing plate. At the second, clamping position, the mechanism is out of the way so that it does not interfere with the processing operation. Because the guiding and clamping functions are combined into one mechanism, only one actuator and one sensor are needed for the guiding and clamping functions.

15 Claims, 10 Drawing Sheets

(51) Int. Cl.
*B42D 25/41* (2014.01)
*B42D 25/24* (2014.01)

(56) References Cited

U.S. PATENT DOCUMENTS

| | | | | |
|---|---|---|---|---|
| 6,783,067 | B2 | 8/2004 | Kreuter et al. | |
| 7,467,450 | B2 * | 12/2008 | Rygol et al. | 29/33 K |
| 2004/0047009 | A1 | 3/2004 | Taylor et al. | |
| 2006/0177286 | A1 * | 8/2006 | Rygol | 412/33 |
| 2011/0044786 | A1 | 2/2011 | Marsh et al. | |

OTHER PUBLICATIONS

International Search Report for PCT/US2013/056342 dated Jan. 20, 2014, 3 pages.

Written Opinion for PCT/US2013/056342 dated Jan. 17, 2014, 7 pages.

* cited by examiner

BOOKLET GUIDE AND CLAMP SYSTEM IN A BOOKLET PROCESSING MECHANISM

This application claims the benefit of U.S. Provisional Application No. 61/692,975 filed on Aug. 24, 2012.

FIELD

This disclosure relates to a system that guides a multiple sheet booklet, such as a passport, into a booklet processing mechanism, for example a laser personalization mechanism or a vision verification mechanism, and securely clamps the booklet in place during processing of a page of the booklet.

BACKGROUND

The use of a laser to lase a page of a multiple sheet booklet such as a passport is disclosed in U.S. Pat. No. 6,783,067 and can be found in commercial systems such as the PB6500™ passport issuance system available from DataCard Corporation of Minnetonka, Minn. To lase a page of a booklet, it is necessary to guide the booklet into proper position, and once in position, to clamp the booklet to securely hold the booklet in position during the lasing operation.

In the case of passports, complicating processing on the booklet, and guiding and clamping the booklet, is that the construction of passports can vary from country to country. These differences include variations in the number of sheets, variations in the dimensions of the booklets such as, for example, variations in the sizes of the outer covers, as well as differences in the materials used to construct the passports which can impact mechanical handling of the passports.

SUMMARY

A booklet processing mechanism is described that includes a booklet guide and clamp system that is configured to act as the guide during entry and exit of the booklet into and from the booklet processing mechanism, as well as clamp and hold the booklet in its proper lasing position during a processing operation. The booklet guide and clamp system is moveable between a first position for guiding an upper, free edge of an opened booklet and a second position where the upper, free edge is clamped against a backing plate. At the second, clamping position, the mechanism is out of the way so that it does not interfere with the processing operation. Because the guiding and clamping functions are combined into one mechanism, only one actuator and one sensor are needed for the guiding and clamping functions.

The booklet processing mechanism can be any mechanism where a page of a booklet should be securely held during processing of the page. Examples of booklet processing mechanisms include, but are not limited to, a laser processing mechanism where a laser is used to personalize a page, and a vision verification mechanism that is used to verify the quality and/or accuracy of personalization on a page.

One advantage of the booklet processing mechanism is that it can accommodate booklets with various constructions and dimensions. Another advantage is that the booklet can be processed without fully opening the booklet 180 degrees. Rather, the described booklet processing mechanism allows the booklet to be opened to about 90 degrees and processed.

The multiple sheet booklets described herein can be any multiple sheet booklet where a sheet needs to be processed, for example by a laser that is used to lase one or more pages of the booklet once it has been opened to apply data to the page such as text, portrait images, security features, and the like. The data can be personal data that is specific to the intended holder of the booklet. The data could also be non-personal data such as a corporate logo. Therefore, the term "personalization" used herein is intended to encompass both personal data and non-personal data applied by a laser. Examples of multiple sheet booklets include, but are not limited to, any ID-3 sized booklets such as passports and identification booklets, passbooks/bankbooks, and the like.

The booklet processing mechanism incorporating the booklet guide and clamp system described herein can be employed on any type of processing system for processing a multiple sheet booklet. Examples of processing systems include modular systems such as the PB6500™ passport issuance system and the system disclosed in U.S. Pat. No. 6,783,067; multi-station processing systems that may not be considered modular but which resemble modular processing systems in performance; desktop processing systems; and the like. Modular and multi-station booklet processing systems are generally configured to process booklets in large volumes, often measured in the hundreds per hour, in a centralized environment. Desktop booklet processing systems are generally configured to process booklets in much smaller volumes, often one at a time, in a decentralized environment.

In one embodiment, a booklet processing mechanism is provided that is configured to process a booklet. The mechanism includes a backing plate, and a guide and clamp mechanism that is mounted on the backing plate for movement relative to the backing plate between a first position at which the guide and clamp mechanism is spaced from the backing plate to guide a booklet and a second position at which the guide and clamp mechanism is closer to the backing plate to clamp the booklet against the backing plate. An actuating mechanism is connected to the guide and clamp mechanism that actuates the guide and clamp mechanism between the first position and the second position.

In one embodiment, the guide and clamp mechanism rotates relative to the backing plate between the first and second positions. However, the guide and clamp mechanism could move in linear directions toward and away from the backing plate between the first and second positions, without rotating.

In another embodiment, the guide and clamp mechanism is configured to be able to seat itself squarely against any booklet, regardless of variations in how the guide and clamp mechanism is built or how it is installed. Also, the guide and clamp mechanism is configured to automatically adjust to variations in thickness of the booklet, so that the guide and clamp mechanism will align itself for each booklet that is input.

In another embodiment, the backing plate can be mounted to rotate about a horizontal axis and/or a vertical axis for MLI/CLI lasing. The rotation of the backing plate can be used in conjunction with, or separately from, the guide and clamp mechanism.

DRAWINGS

DETAILED DESCRIPTION

Figure 9:
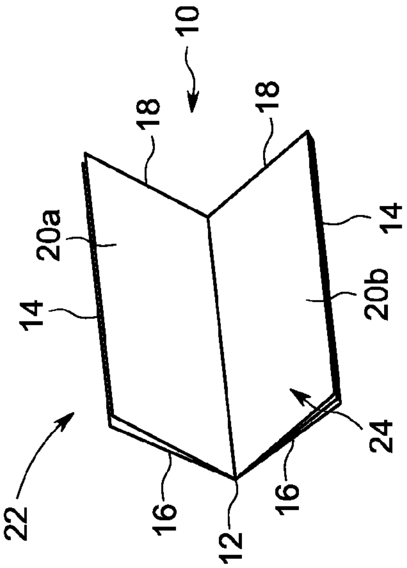
FIG. 9 illustrates a multiple sheet booklet.

With reference initially to FIG. 9, a multiple sheet booklet 10 is illustrated. The booklet can be any multiple sheet booklet where some form of processing, such as lasing or vision verification, occurs on one or more pages of the booklet once it has been opened. Examples of multiple sheet booklets include, but are not limited to, any ID-3 sized booklets such as passports and identification booklets, passbooks/bankbooks, and the like. In the case of lasing, a laser can be used to apply data to the page such as text, a portrait image(s) or other security features, and the like. Vision verification can be used to verify the accuracy and/or quality of data that has been applied to the page of the booklet.

The booklet 10 includes a plurality of sheets including a front cover, a back cover, and a plurality of intermediate sheets between the front cover and the back cover. The sheets are bound, for example by sewing a stitching thread along one edge to form a spine 12. The free edges 14 of the sheets opposite the spine 12 and the opposite side edges 16, 18 are unbound. FIG. 9 shows the booklet 10 opened to two adjacent intermediate sheets 20*a*, 20*b*. Each sheet of the booklet includes two pages that can be referred to as a front or first page and a back or second page. Based on this terminology, in FIG. 9 the front page of the sheet 20*a* faces the back page of the sheet 20*b*.

For sake of convenience, the booklet 10 when opened will be described herein as having a first half 22 that includes the sheet 20*a* and a second half 24 that includes the sheet 20*b*. This is not meant to imply that the same number of sheets is contained in each half 22, 24. Instead, it is to be understood that the number of sheets in each half 22, 24 can be different from one another.

Figure 1:
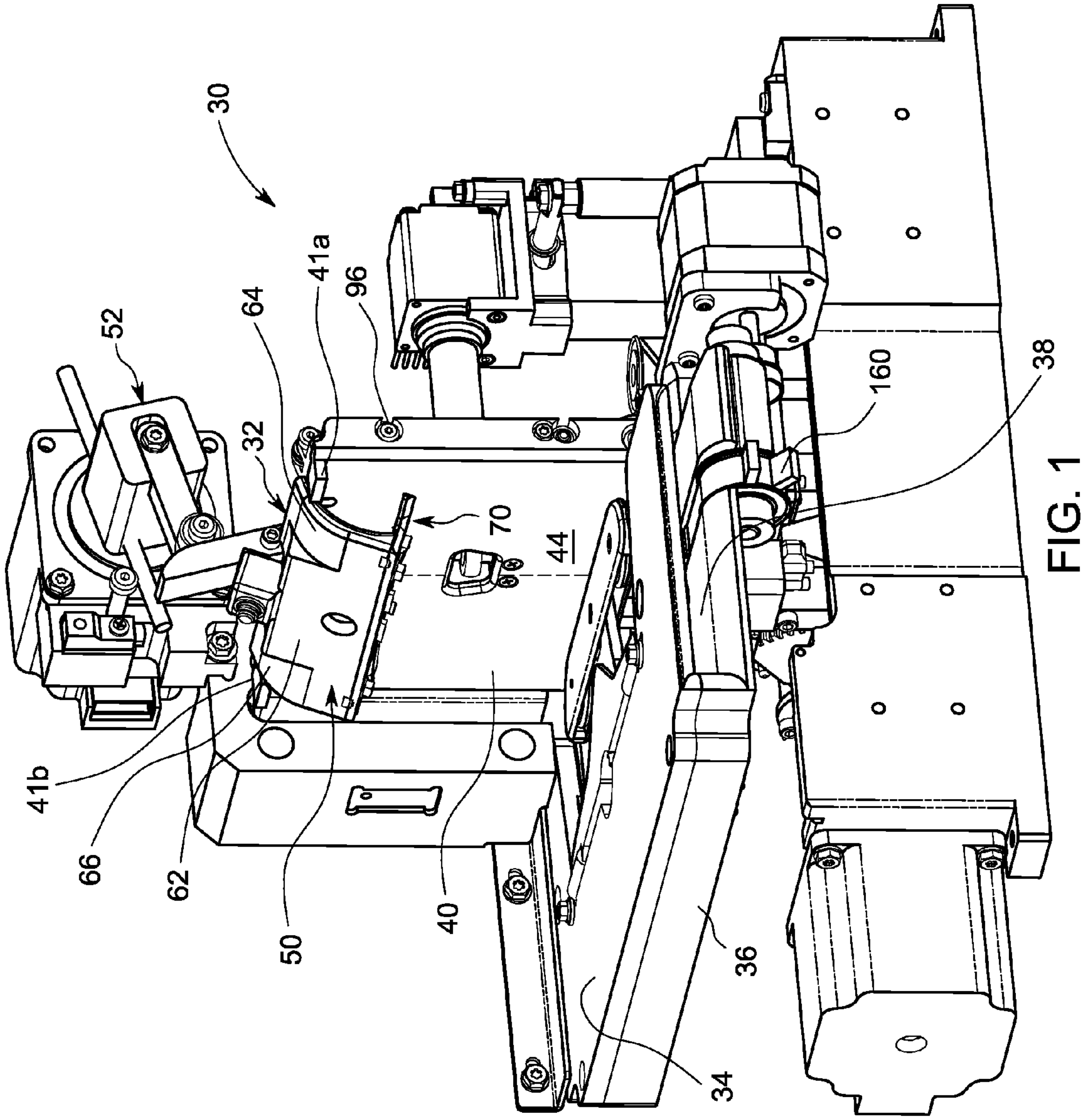
FIG. 1 is a perspective view of a portion of a booklet processing mechanism that includes the booklet guide and clamp system described herein in a guiding position.
Figure 2:
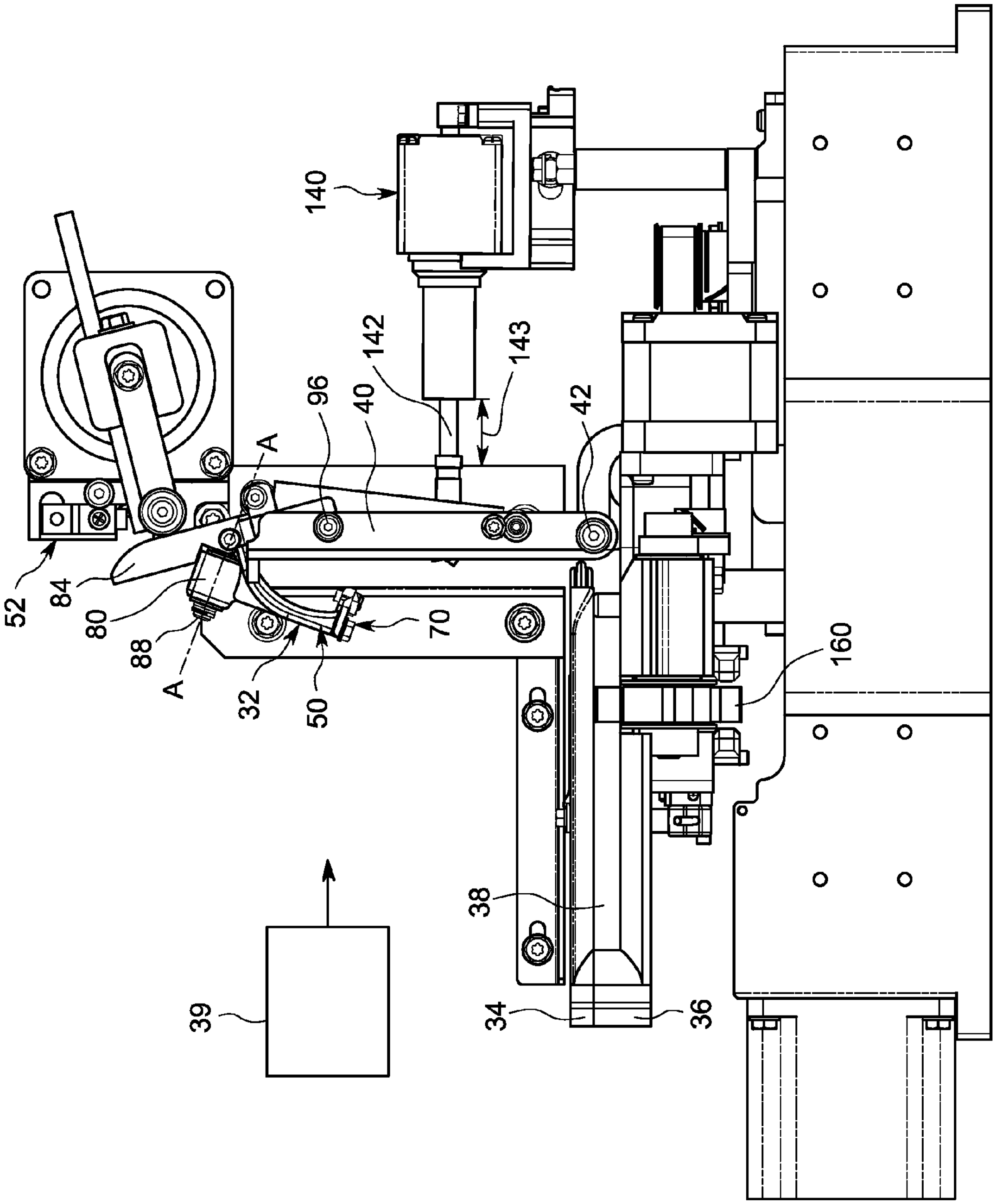
FIG. 2 is a side view of FIG. 1.
Figure 3:
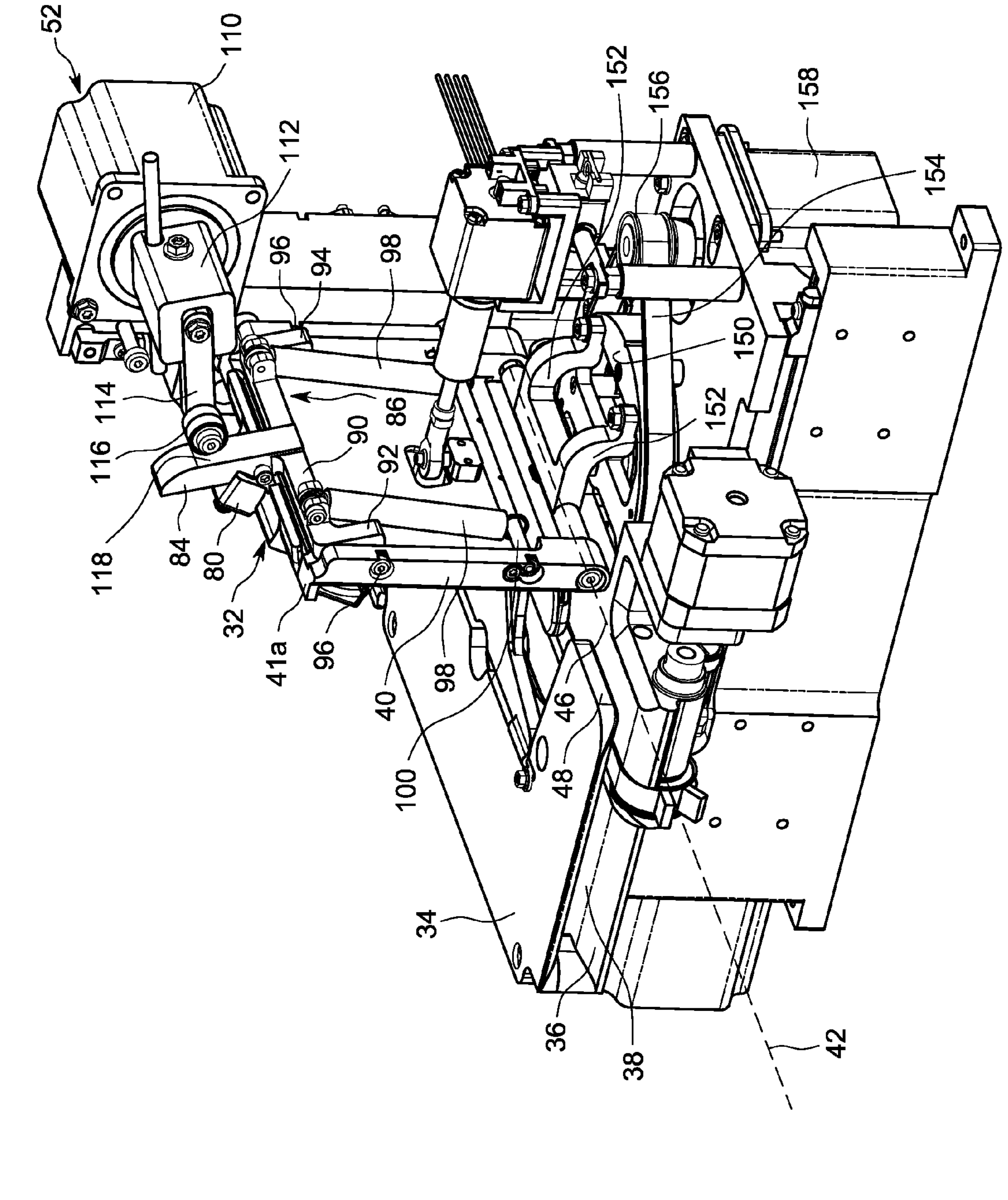
FIG. 3 is a rear perspective view of the portion shown in FIG. 1.

Turning to FIGS. 1-3, a portion of a booklet processing mechanism 30 that includes a guide and clamp system 32 is illustrated. The mechanism 30 includes a fixed platform 34 that is attached to a base 36. A transport path 38 for the booklet half 24 is defined between the platform 34 and the base 36 so that the booklet half 24 travels underneath the platform 34. The platform 34 and the base 36 are oriented substantially in a horizontal plane in the mechanism 30.

Hereinafter, the mechanism 30 will be described as being a laser processing mechanism that employs a laser to process, i.e. personalize, a page of the booklet. However, it is to be understood that the mechanism 30 is not limited to a laser processing mechanism, but can include other booklet processing mechanisms where it is beneficial to securely hold a page of a booklet in the manner described herein. An example of another booklet processing mechanism includes, but is not limited to, a vision verification system.

A backing plate 40 is mounted adjacent to a front end of the platform 34. The plate 40 is illustrated in FIGS. 1-3 as being oriented in a vertical plane generally perpendicular to the platform 34. In use, the backing plate 40 supports the booklet half 22 which is pressed against the backing plate. This presents the sheet 20*a* in a substantially vertical plane against the backing plate so that the front page thereof can be lased by a laser system 39 (see FIG. 2). The laser system is suitably mounted adjacent to the platform 34 for projecting laser pulses toward the backing plate 40 and the vertically oriented page of the sheet 20*a* supported thereby in order to perform laser personalization. An example of a suitable laser system is described in U.S. Pat. No. 6,783,067.

A pair of stops 41*a*, 41*b* at the top of the backing plate 40 provide a uniform reference point that the booklet is aligned to when in the lasing position. In one embodiment, the booklet can be lifted upward (i.e. vertically in FIG. 1) so that the upper half of the booklet is referenced against the stops 41*a*, 41*b* prior to clamping. This would provide an additional alignment for more precise positioning of the booklet.

As described further below, the backing plate 40 can be mounted to pivot about a horizontal axis 42 and/or about a vertical axis 44. These movements of the backing plate 40 about the axes 42, 44 are useful when MLI/CLI lasing on the booklet is desired.

With reference to FIG. 2, the booklet 10 is fed in an open condition into the mechanism 30 from the input side (i.e. the side visible in FIG. 1 and from which FIG. 2 is viewed) from a suitable upstream feed mechanism (not illustrated). The booklet 10 can be opened by a suitable mechanical opening mechanism, an example of which is described in U.S. Pat. No. 6,783,067, or the booklet can be manually opened by a human operator with the opened booklet then being fed by the feed mechanism into the mechanism 30.

When the booklet is fed into the mechanism 30, the booklet half 24 is disposed between the platform 34 and the base 36 in the transport path 38, while the booklet half 22 is generally perpendicular to the booklet half 24. The spine 12 travels in a gap 46 that is formed between a front edge 48 of the platform and the front of the backing plate 40 as seen in FIG. 3. The spine 12 can be guided into and from the mechanism using any suitable guide mechanism, and the portion of the booklet half adjacent to the spine is pressed against the backing plate to hold the portion of the booklet half adjacent to the spine against the backing plate 40 during lasing.

An example of a suitable combined guide and clamp mechanism for the portion of the booklet half adjacent to the spine is described in U.S. Patent Application Ser. No. 61/692,973, titled “Booklet Spine Guidance System In A Booklet Processing Mechanism”, filed on Aug. 24, 2012, which is incorporated by reference herein in its entirety, and discussed further below. However, other spine guide and clamp constructions, such as the construction disclosed in U.S. Pat. No. 6,783,067, can be used.

Returning to FIGS. 1-3, the guide and clamp system 32 includes a guide and clamp mechanism 50 that is mounted on the backing plate 40 for movement relative to the backing plate between a first, guiding position (FIGS. 1-3) at which the guide and clamp mechanism 50 is spaced from the backing plate to guide the booklet half 22 during input and output of the booklet 10, and a second, clamping position (FIGS. 4-6) at which the guide and clamp mechanism 50 is closer to the backing plate to clamp the free or upper edge of the booklet half 22 against the backing plate during lasing. In addition, an actuating mechanism 52 is provided that engages the guide and clamp mechanism 50 to actuate the guide and clamp mechanism between the first position and the second position.

In the illustrated embodiment, the guide and clamp mechanism 50 is shown and described as being rotatably mounted to the backing plate 40 so that the guide and clamp mechanism 50 rotates as it moves between the first and second positions. However, other mounting arrangements for the guide and clamp mechanism 50 could be provided, for example such that the mechanism 50 moves in linear directions toward and away from the backing plate between the first and second positions, without the mechanism 50 rotating.

Figure 7:
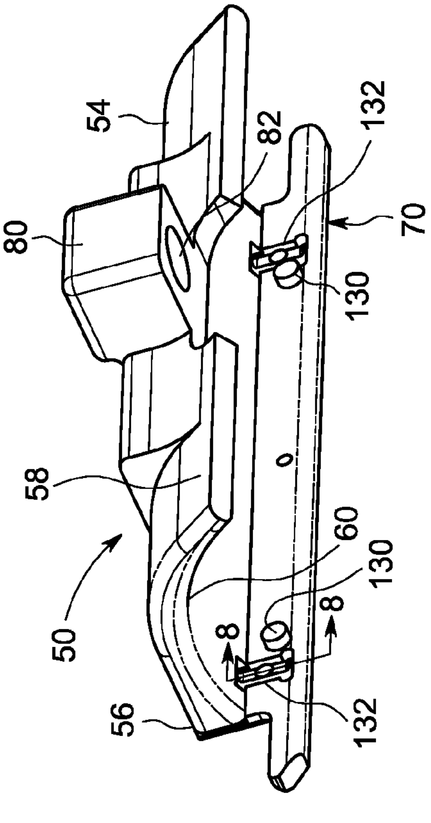
FIG. 7 is a rear perspective view of the guide and clamp mechanism.

With reference to FIGS. 1-3 and 7, the illustrated guide and clamp mechanism 50 includes a mount 54 having a front end 56 and a rear end 58. As best seen in FIGS. 2 and 7, an interior side 60 of the mount 54 is generally curved downwardly from the front end 56 to the rear end 58. A top side of the mount 54 has a generally flat, t-shaped region 62 (best seen in FIG. 1), with downwardly curved sections 64, 66 on each side of the stem of the t-shaped region 62.

Figure 4:
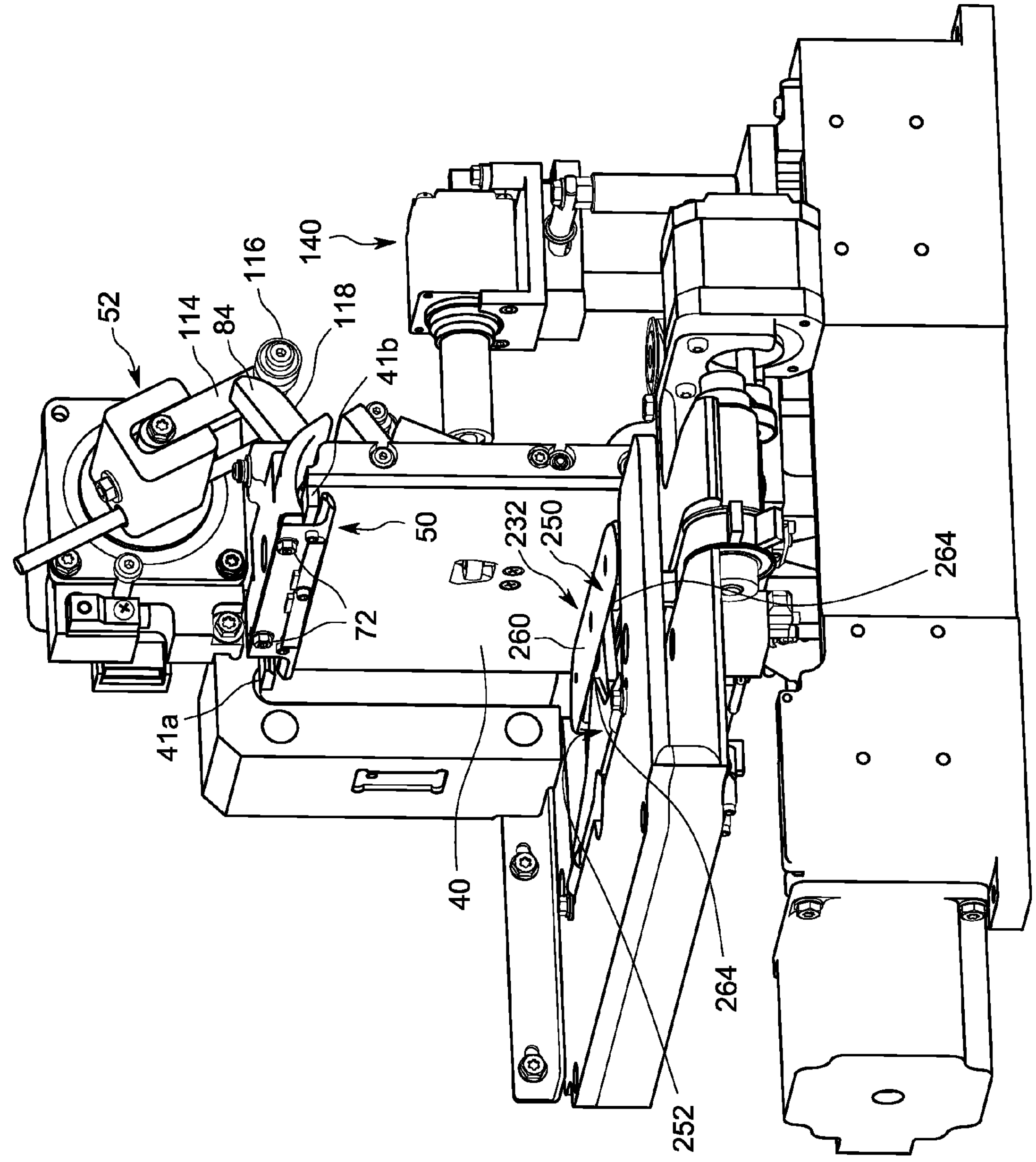
FIG. 4 is a perspective view similar to FIG. 1 but with the booklet guide and clamp system in a clamping position.

A guide/clamp structure 70 is mounted at the front end 56 of the mount 54 via screws 72 or the like (see FIG. 4). The guide/clamp structure 70 is designed to guide the upper, free end of the booklet half 22 as the booklet is input and discharged from the mechanism 30, as well as engage the booklet half 22 to clamp the upper, free end to the backing plate 40. Because the guide/clamp structure 70 physically engages the booklet 10, the construction and materials of any portions of the guide/clamp structure 70 that contact the booklet should be selected to avoid damaging or marring the sheets engaged thereby. For example, the guide/clamp structure 70 can be made of any suitable material that avoids damaging or marring the booklet page, for example rubber, plastic, or any other low abrasion material.

The rear end 58 of the mount 54 includes a mounting block 80 with a hole 82 extending through the block 80 as best seen in FIG. 7. As shown in FIG. 3, the mounting block 80 is attached to an arm 84 of a rotating mount 86. The block 80 is attached to the arm 84 via a pivot 88 that permits the entire guide and clamp mechanism 50 to pivot relative to the arm 84 and the rotating mount 86 about an axis A-A of the pivot 88 (i.e. about the axis of the hole 82).

The rotating mount 86 further includes a central bar 90 that is secured to the arm 84, and flanges 92, 94 at opposite ends of the bar 90 that are rotatably mounted to the backing plate by pivot mounts 96 (only one mount 96 is visible in the figures). One or more biasing members 98 (best seen in FIGS. 3 and 5), for example a pair of extension springs, have one end connected to the central bar 90 and a second end connected to a mounting rod 100. The biasing member(s) 98 bias the rotating mount 86 in a clockwise direction when viewing FIG. 2, which biases the guide and clamp mechanism 50 toward the clamping position shown in FIGS. 4-6 from the guiding position shown in FIG. 1-3. Any form and number of biasing member(s) 98 can be used as long as the rotating mount 86 and the guide and clamp mechanism 50 are biased in the manner discussed above.

The actuating mechanism 52 is suitably connected to the guide and clamp mechanism 50 to actuate the guide and clamp mechanism between the first position and the second position. In the illustrated example, the actuating mechanism 52 comprises an actuating motor 110 that rotates an output block 112 having a link arm 114 fixed thereto. The end of the link arm 114 includes a cam roller 116 mounted thereto that in use rolls along a bottom side 118 of the arm 84 to force the arm 84 up to the position shown in FIGS. 1-3.

With reference to FIGS. 1-3, as the output block 112 is rotated counterclockwise in FIG. 2, the biasing member(s) 98 force the arm 84 and the rotating mount 86 clockwise about the pivot mounts 96. The bias of the biasing member(s) 98 maintains the bottom side 118 of the arm 84 in engagement with the cam roller 116 for controlled movements. As the arm 84 rotates clockwise, the guide and clamp mechanism 50 attached to the arm pivots therewith to the position shown in FIGS. 4-6.

At the first position shown in FIGS. 1-3, the guide/clamp structure 70 of the guide and clamp mechanism 50 is spaced away from the backing plate 40 a sufficient distance to permit entry of the upper, free edge of the booklet half 22 between the guide/clamp structure 70 and the backing plate 40 during input of a booklet to be lased.

Figure 5:
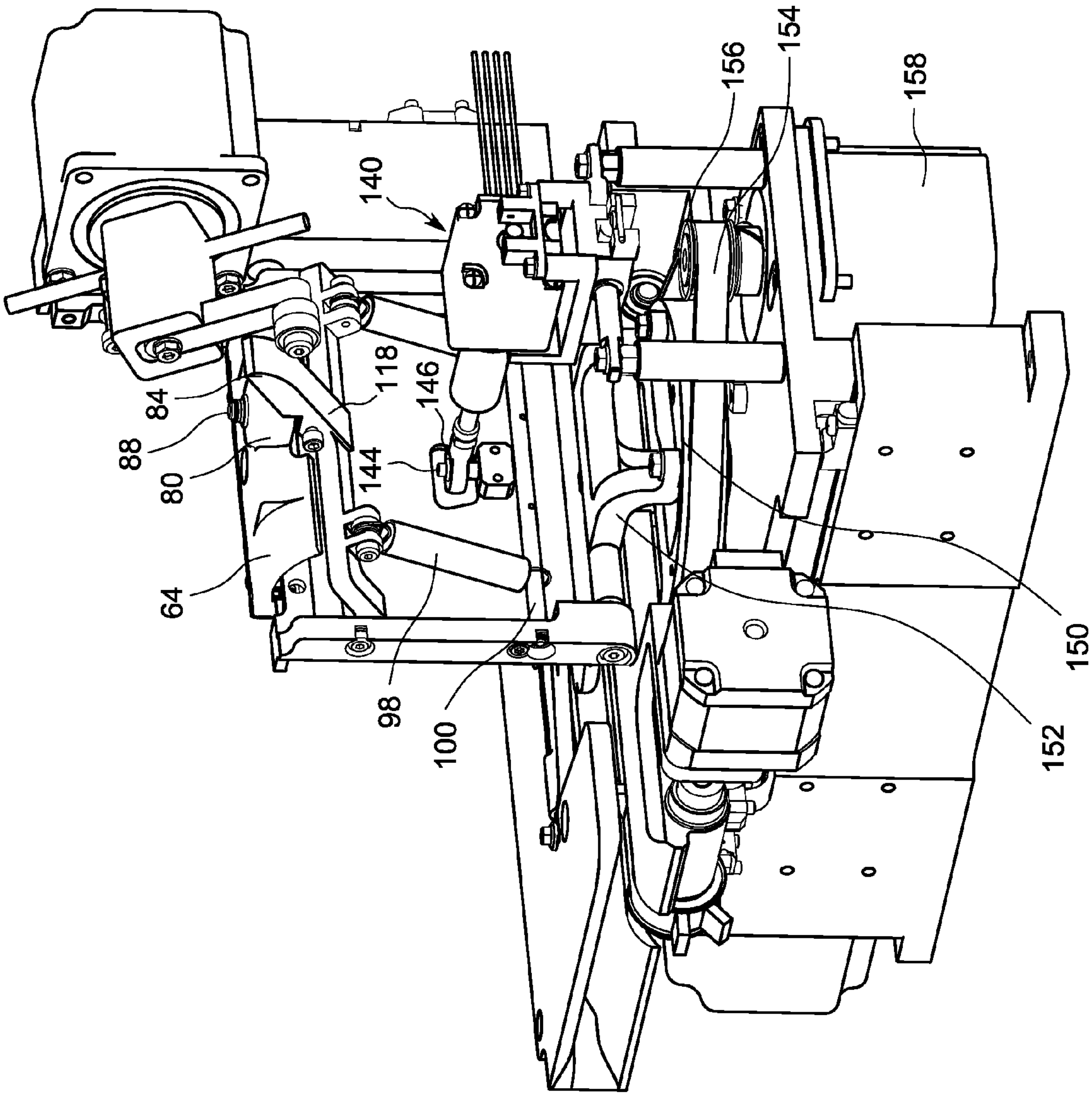
FIG. 5 is a rear perspective view of FIG. 4.
Figure 6:
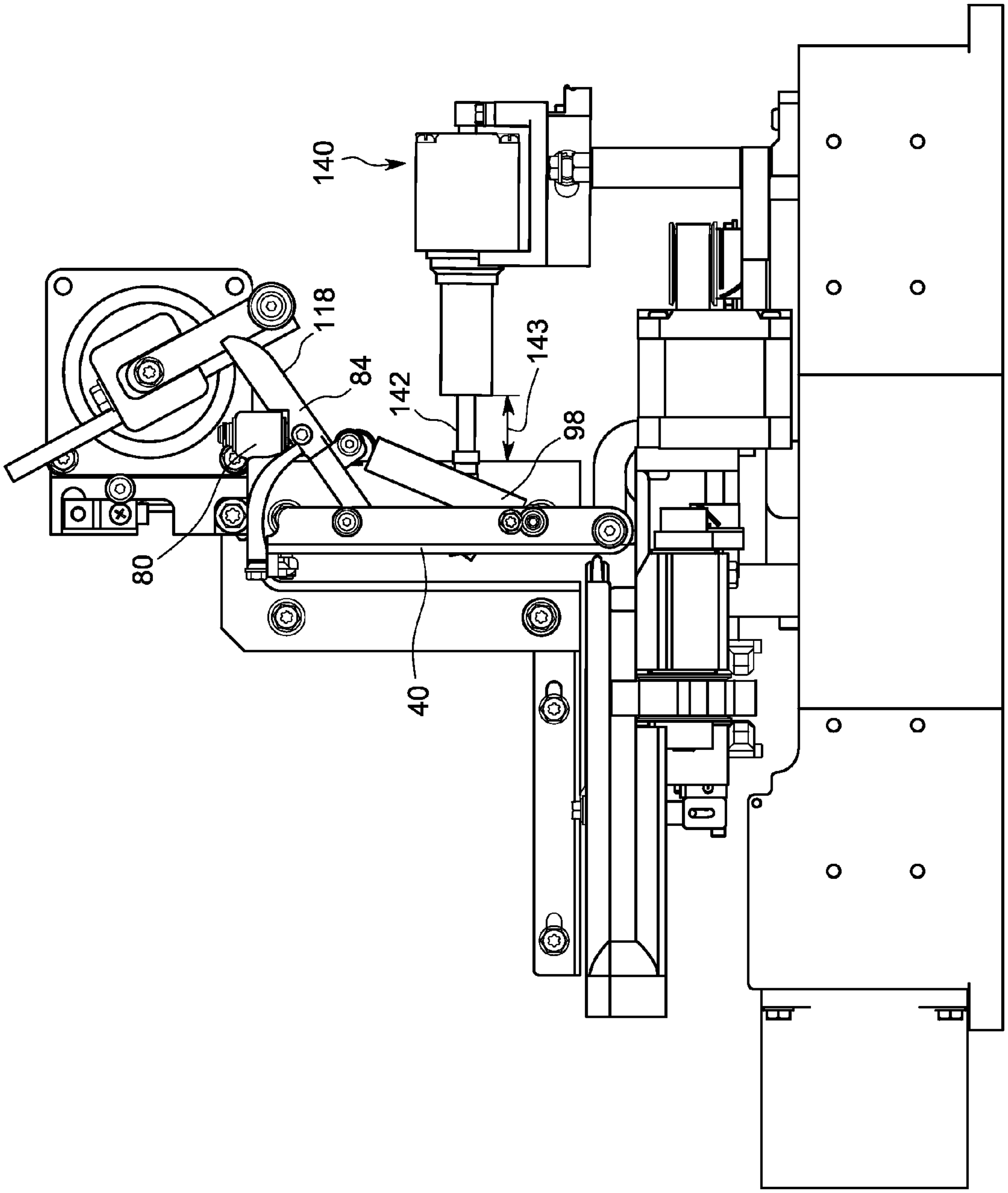
FIG. 6 is a side view of FIG. 4.

Once the booklet is in lasing position, the guide and clamp mechanism 50 is rotated by the actuating mechanism 52 to the position shown in FIGS. 4-6. At the second position, the guide/clamp structure 70 is moved closer to the backing plate 40, in particular close enough so that the upper, free edge of the booklet half 22 is clamped between the guide/clamp structure 70 and the backing plate 40 to securely hold the booklet at the lasing position. As evident from FIGS. 4-6, the guide/clamp structure 70 is adjacent to the top edge of the backing plate so that the guide/clamp structure 70 is out of the way and does not interfere with the laser during a lasing operation.

Once lasing is completed, the guide and clamp mechanism 50 is actuated by the actuating mechanism 52 back to the first position shown in FIGS. 1-3. The booklet is then transported out of the mechanism 30.

The force provided by the biasing member(s) 98 provides the holding force on the booklet. The maximum holding force is achieved when the booklet is clamped by the guide and clamp mechanism 50. As the guide and clamp mechanism 50 is actuated back toward its first, guiding position, the force provided by the biasing member(s) 98 decreases and is minimal when the guide and clamp mechanism 50 is fully at the first position. With this construction, no holding current is required to be applied to the motor 110 or to the MLI motor discussed further below. This is advantageous when a booklet needs to be manually removed from the mechanism 30.

Figure 8:
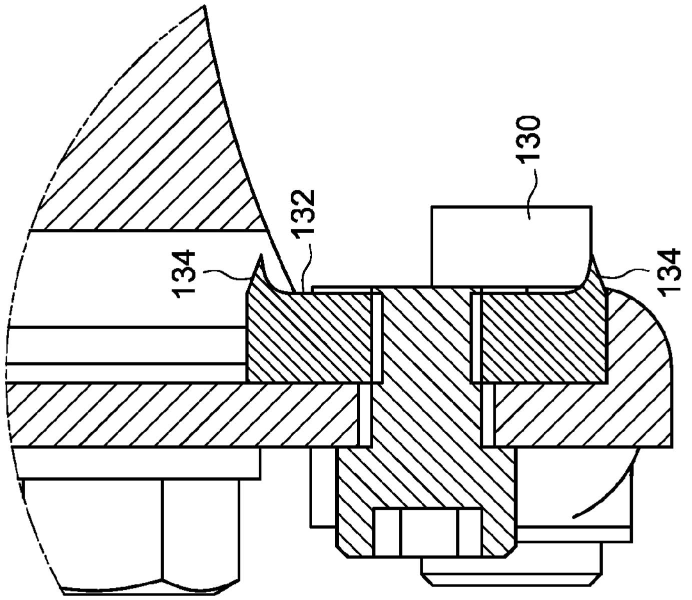
FIG. 8 is a detailed close-up view of the cross-sectional portion taken along lines 8-8 in FIG. 7.

With reference to FIGS. 7 and 8, the guide and clamp mechanism 50 can be provided with optional features that facilitate and enhance the clamping effect by the guide and clamp mechanism 50. For example, at least one guide pin 130 (in the illustrated example two guide pins 130) can be mounted on the guide/clamp structure 70 and extend from the surface of the structure 70 that, in the second position, faces the backing plate 40. The guide pin(s) 130 can be spring loaded outwardly in a direction toward the backing plate. As the guide/clamp structure 70 is engaging the booklet half 22 to clamp it against the backing plate 40, the guide pin(s) 130 help to push the upper, free edge of the booklet half back into the backing plate. In addition, the spring loading on the guide pin(s) 130 allows the guide pin(s) to accommodate different thicknesses of the booklet half 22.

The guide/clamp structure 70 can also optionally include at least one pick 132 (in the illustrated example two picks 132) mounted thereon adjacent to the guide pin(s) 130. The pick(s) 132, if used, are designed to increase the hold between the guide/clamp structure 70 and the booklet half 22 to prevent unintended movements of the booklet half 22 during the lasing operation. The pick(s) 132 can have any configuration and be made of any material suitable for achieving this function. In the illustrated example, the pick(s) 132 includes a plurality of teeth 134 configured as relatively sharp points that can slightly dig into the booklet half 22 during clamping to increase the holding force, but without significantly marring the sheet(s) of the booklet half.

As shown in FIG. 8, the guide pin(s) 130 initially projects from the guide/clamp structure 70 toward the backing plate

40 a larger distance than the pick(s) 132. This ensures that the guide pin(s) engage the booklet half 22 before the pick(s) does in order to properly position the booklet half against the backing plate prior to the teeth of the pick(s) engaging the booklet, thereby preventing the teeth of the pick(s) from scratching the booklet as it is being moved into and secured at the lasing position.

Figure 10:
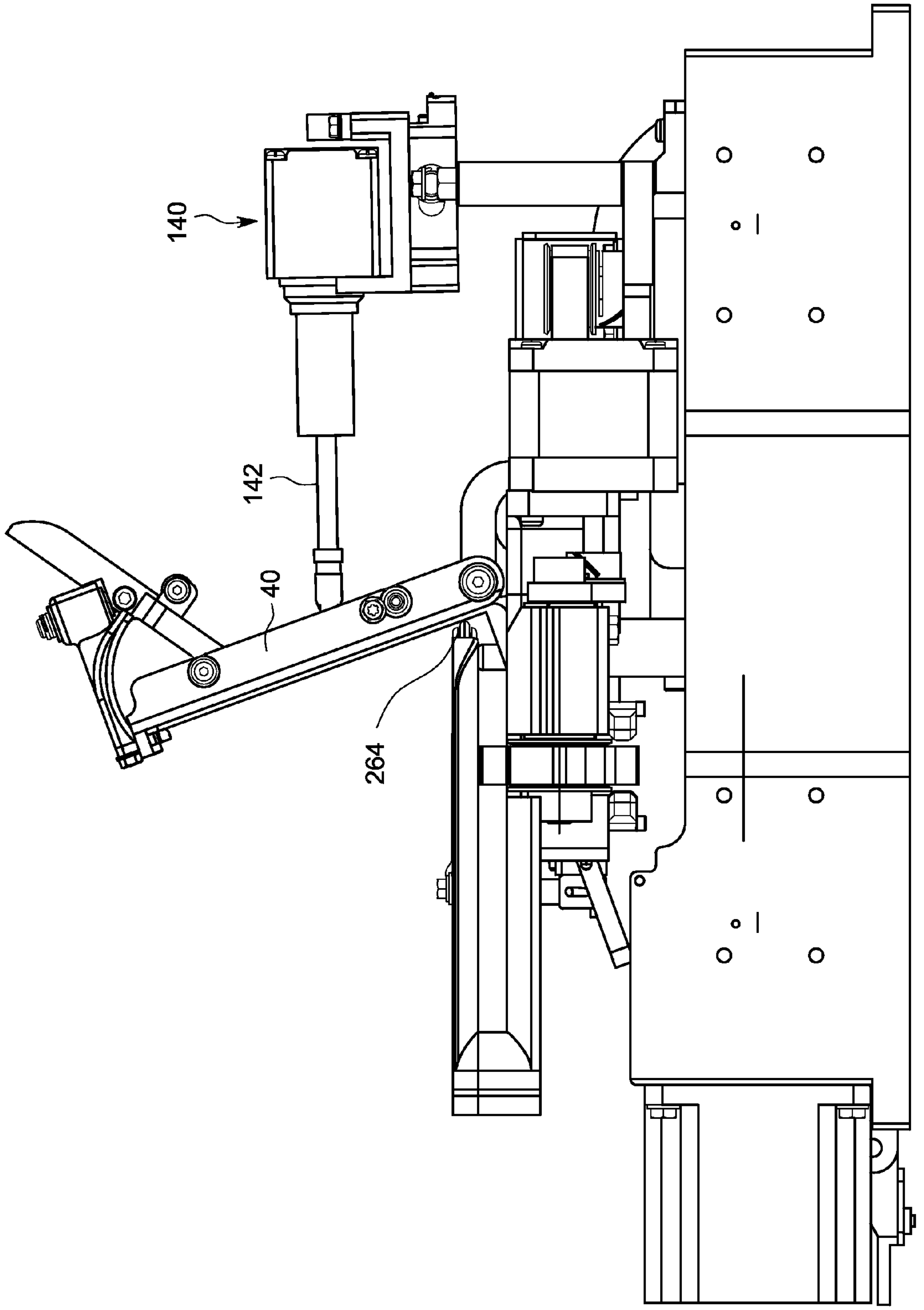
FIG. 10 is a side view of the booklet processing mechanism with the backing plate tilted about the MLI axis for an MLI laser operation.

As indicated above, the backing plate 40 can be mounted to pivot about the horizontal axis 42 and/or about the vertical axis 44, which is useful when MLI/CLI lasing on the booklet is desired. With reference to FIGS. 2, 5 and 6, pivoting of the backing plate 40 about the horizontal MLI axis 42 is achieved using an actuator 140, such as an electric motor. The actuator 140 includes a shaft 142 that can extend and retract in the direction of the arrows 143 shown in FIGS. 2 and 6 (i.e. toward and away from the backing plate). The end of the shaft 142 is fixed to a pin 144 via a spherical bearing 146. The pin 144 is fixed to the backing plate 40. When the shaft 142 extends and retracts, the backing plate pivots about the axis 42 as shown in FIG. 10. Since the guide and clamp mechanism 50 is mounted on the backing plate, it pivots with the backing plate about the axis 42. The actuating mechanism 52 is fixed and does not pivot with the backing plate 40.

Figure 11:
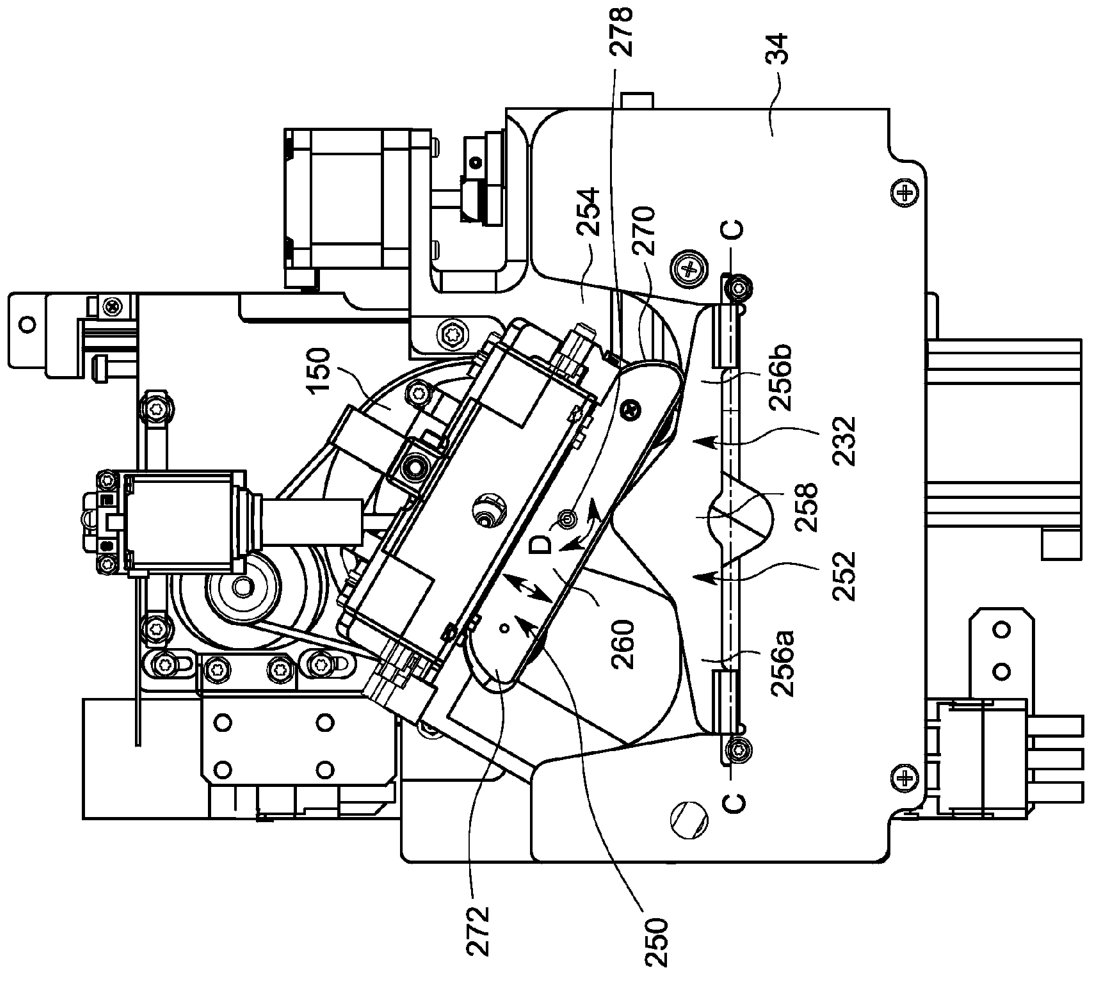
FIG. 11 is a top view of the booklet processing mechanism with the backing plate tilted about the CLI axis for a CLI laser operation.
Figure 12:
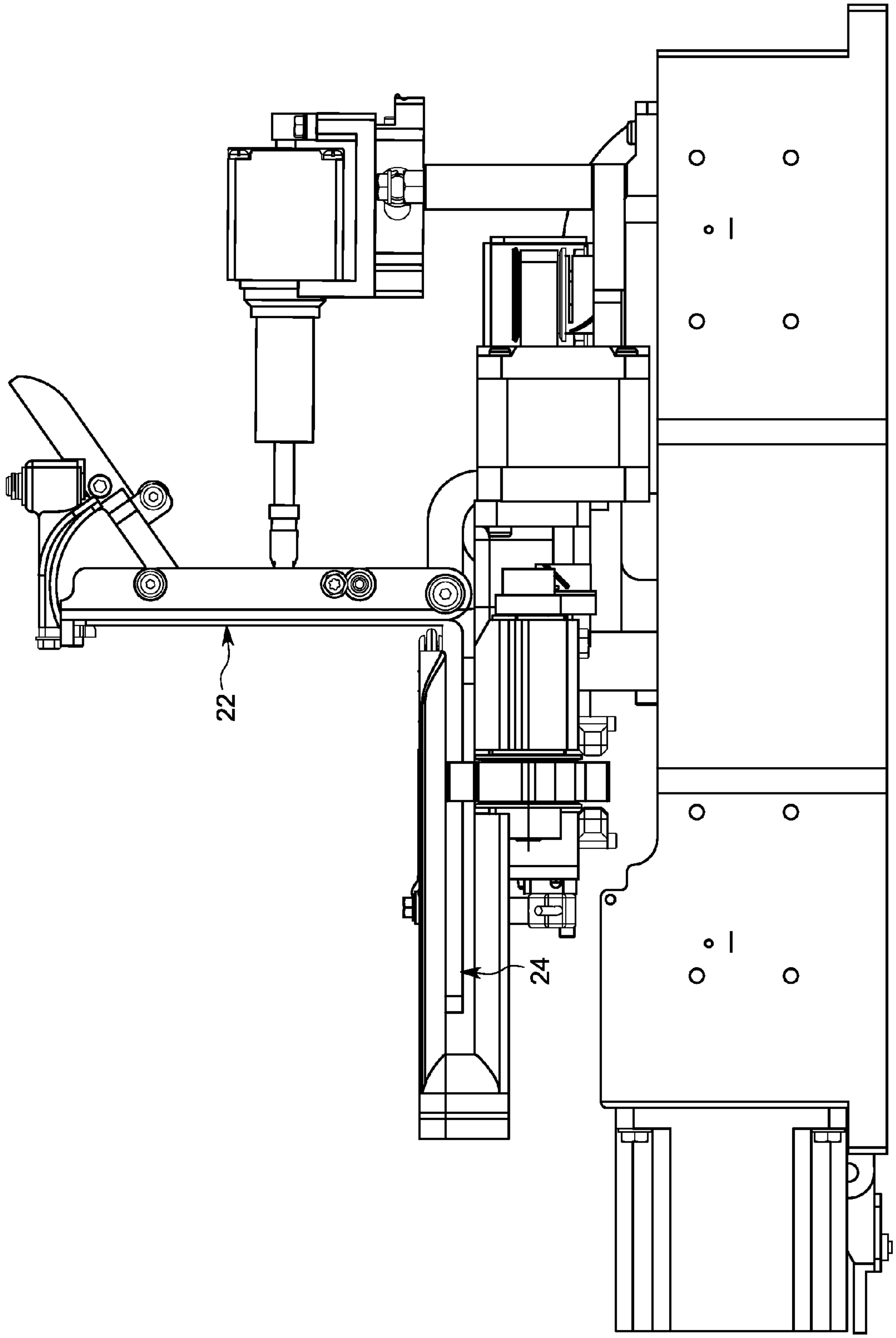
FIG. 12 is a side view of the booklet processing mechanism showing the booklet in its processing position and pressed against the backing plate.

In addition, the backing plate 40 is mounted on a rotatable turret 150 via legs 152 as best seen in FIGS. 3 and 5. The turret 150 is rotatable to rotate the backing plate about the vertical axis 44. The turret 150 is rotated via a drive belt 154 that is driven by a pulley 156 connected to the output shaft of a reversible actuator 158, for example an electric motor. When the actuator 158 rotates the pulley 156, the turret 150 is rotated which in turn rotates the backing plate and all elements mounted thereon about the vertical axis 44 as shown in FIG. 11.

In use of the mechanism 30, with reference initially to FIGS. 1-3, an opened booklet 10 is fed into the mechanism through the input side from an upstream feed mechanism (not illustrated). The booklet half 24 is disposed between the platform 34 and the base 36 in the transport path 38, while the booklet half 22 is generally perpendicular to the booklet half 24. The spine 12 and the portion of the booklet half adjacent to the spine 12 travel in the gap 46 between the front edge 48 of the platform and the front of the backing plate 40. The upper free edge of the booklet half 22 is guided between the guide and clamp mechanism 50 and the backing plate 40.

The upstream feed mechanism partially feeds the booklet into the mechanism 30, with a tabbed transport belt 160 picking up the booklet from the upstream feed mechanism and continuing feeding of the booklet into and through the mechanism 30. The feeding and transport of booklets into, through and from a laser personalization mechanism is well known in the art.

The transport belt 160 transports the booklet until the booklet half 22 is substantially centered on the backing plate 40 which is the lasing position. Once in this position, the actuating mechanism 52 is actuated to actuate the guide and clamp mechanism 50 to the second position shown in FIGS. 4-6 to clamp the upper, free end of the booklet half 22 against the backing plate.

As discussed above, a guide and clamp mechanism 232 is provided to guide the booklet half 22 adjacent to the spine as it is being input into the mechanism, to apply a force on the booklet half 22 adjacent to the spine 12 in order to hold the portion of the booklet half 22 adjacent to the spine against the backing plate 40 during lasing, and to accommodate different booklet half thicknesses.

With reference to FIGS. 4 and 11, the mechanism 232 includes a spine guide 250 and a mounting bar 252. The mechanism 232 is disposed within a cut-out section 254 of the platform. The mounting bar 252 comprises a generally T-shaped structure having a pair of arms 256*a*, 256*b* that extend from a central section 258. The arms 256*a*, 256*b* are pivotally mounted at each end thereof to the platform 34 to allow the mounting bar 252 to be pivoted upward about an axis C-C (best seen in FIG. 11) to a raised position. A biasing mechanism, for example one or more springs, act on the arms 256*a*, 256*b* or other portions of the mounting bar 252 to bias the mounting bar to the position shown in FIGS. 4 and 11. For example, coil springs can be provided around pivot pins that mount the arms 256*a*, 256*b* to the platform 34 to provide the biasing force.

The width of the cut-out section 254 is greater than the width of the booklet 10. This permits access to and manual removal of a booklet from the lasing position by pivoting the mounting bar 252, and the spine guide 250 connected thereto, upward to the raised position about the axis C-C.

The spine guide 250 is mounted to the mounting bar 252 so as to be biased in a direction toward the backing plate 40 and to be able to pivot relative to the mounting bar about a vertical axis. The spine guide 250 is designed to be in physical engagement with the booklet half adjacent to the spine 12, and guides the booklet as it is being fed into and from the mechanism 30 and to press the booklet against the backing plate 40. In addition, the pressing force applied by the spine guide helps to retain the booklet at the lasing position. Further, the spine guide 250 can adjust to accommodate different booklet half 22 thicknesses. In addition, the spine guide 250 presses on the booklet half 22 to provide some friction to prevent the booklet from coasting past its intended lasing position during feeding of a booklet into position.

The spine guide 250 can have any construction suitable for performing the functions of the spine guide described herein. For example, the spine guide 250 can have a pair of mounting plates 260 that are spaced from one another by spacers. A pair of thin rollers 264 are rotatably mounted between the plates 260 on each side of the central section 258 via axles so that the rollers 264 can freely rotate. The rollers 264 are designed to roll along the surface of the page of the booklet as the booklet is fed into and from the mechanism 30. Since the rollers and other elements of the spine guide 250 engage with the booklet, the construction and materials of the spine guide 250 should be selected to avoid damaging or marring the sheets engaged thereby. For example, the rollers 264 can be made of any suitable material that avoids damaging or marring the booklet page, for example rubber, plastic, or any other low abrasion material. Likewise, the plates 260, or portions thereof that in use contact the booklet, can be made of a smooth plastic or other low abrasion material such as hard coated aluminum.

As best seen in FIGS. 2 and 10, the rollers 264 have a diameter such that the rollers extend slightly beyond a front edge of the plates 260 to permit engagement with the booklet half 22. As seen in FIG. 11, an input side 270 of the plates 260 is gradually curved, as is an output side 272. This curvature of the input side 270 and the output side 272 helps to guide the booklet into and from the mechanism 30.

The spine guide 250 is pivotally mounted at its center to the end of the central section 258 of the mounting bar 252 to permit the spine guide to pivot about the axis D as shown in FIG. 11. As described in detail in U.S. Patent Application Ser. No. 61/692,973, titled "Booklet Spine Guidance System In A Booklet Processing Mechanism", the end of the central section 258 includes a slot formed therein, with a slide block slidably disposed in the slot for movement in directions toward and away from the backing plate 40. A vertical axle 278 interconnects the plates 260 with the axle being rotatably supported by a bearing that is slidably disposed within the slot and engaged with the slide block.

A biasing mechanism acts on the slide block to bias the slide block and the bearing, and thus the spine guide 250 as a whole, in a direction toward the backing plate 40. The biasing mechanism can includes a pin that is disposed within a hole formed in the central section 258 and has one end engaged with the slide block. A second end of the pin is engaged with a spring, such as a coil spring, that is disposed within the hole.

As a result, the spine guide 250 as a whole is moveable in the direction of the arrows shown in FIG. 11 in a direction toward and away from the backing plate 40 perpendicular to the axis D. This permits the spine guide to accommodate different booklet half 22 thicknesses.

As seen in FIG. 4, the top surface of the upper mounting plate 260 is approximately level with the surface of the platform 34. Thus, the spine guide 250 has a low vertical height that allows it to guide and bias the booklet adjacent to the spine against the backing plate without obstructing the laser. Therefore, the laser is able to perform laser personalization on the necessary portions of the booklet without obstruction by the spine guide.

Once the booklet is in position, a lasing operation can then be performed. If MLI/CLI lasing is desired, the backing plate can be actuated to pivot about the axes 42, 44 as described above. After lasing is completed, the booklet is transported by the tabbed transport belt 160 to exit the mechanism 30 through the output side (which is opposite the input side).

The embodiments disclosed in this application are to be considered in all respects as illustrative and not limitative. The scope of the claimed invention is indicated by any appended claims rather than by the foregoing description, and all changes which come within the meaning and range of equivalency of the claims are intended to be embraced therein.

The invention claimed is:

1. A booklet processing mechanism configured to process a booklet, comprising:
- a backing plate;
- a guide and clamp mechanism that is mounted on the backing plate for movement relative to the backing plate between a first position at which the guide and clamp mechanism is spaced from the backing plate to guide a booklet and a second position at which the guide and clamp mechanism is closer to the backing plate to clamp the booklet against the backing plate;
- an actuating mechanism that is engageable with the guide and clamp mechanism to actuate the guide and clamp mechanism to the first position;
- the backing plate includes an upper edge and a lower edge; and the guide and clamping mechanism is positioned adjacent to the upper edge;
- the backing plate is pivotable along the lower edge about a horizontal axis, and the backing plate is pivotable about a vertical axis; and
- the guide and clamp mechanism is movable with the backing plate when the backing plate pivots about the horizontal axis and the vertical axis.

2. The booklet processing mechanism of claim 1, wherein the guide and clamping mechanism is rotatably movable relative to the backing plate between the first position and the second position.

3. The booklet processing mechanism of claim 1, wherein the guide and clamping mechanism is biased toward the second position.

4. The booklet processing mechanism of claim 1, wherein the guide and clamping mechanism comprises at least one guide pin that faces the backing plate when the guide and clamping mechanism is in the second position, and the guide pin is biased in a direction toward the backing plate.

5. The booklet processing mechanism of claim 4, wherein the guide and clamping mechanism comprises a pick that faces the backing plate when the guide and clamping mechanism is in the second position, the pick is configured to increase hold between the guide and clamping mechanism and the booklet; and the guide pin projects from the guide and clamping mechanism toward the backing plate a larger distance than the pick.

6. The booklet processing mechanism of claim 1, further comprising first and second stops on the backing plate at the upper edge thereof, and the first and second stops are positioned at opposite ends of the guide and clamp mechanism.

7. A booklet processing mechanism configured to process a booklet, comprising:
- a backing plate;
- a guide and clamp mechanism that is mounted on the backing plate for movement relative to the backing plate between a first position at which the guide and clamp mechanism is spaced from the backing plate to guide a booklet and a second position at which the guide and clamp mechanism is closer to the backing elate to clamp the booklet against the backing plate;
- an actuating mechanism that is engageable with the guide and clamp mechanism to actuate the guide and clamp mechanism to the first position;
- the guide and clamping mechanism is rotatably movable relative to the backing plate between the first position and the second position; and
- the guide and clamping mechanism is also pivotable relative to the backing plate.

8. A passport processing mechanism configured to process a passport, comprising:
- a backing plate that in use supports a first half of the passport;
- a platform that defines a transport path in which during use a second half of the passport is disposed;
- a guide and clamp mechanism that is mounted on the backing plate for movement relative to the backing plate between a first position at which the guide and clamp mechanism is spaced from the backing plate to guide the first half of the passport and a second position at which the guide and clamp mechanism is closer to the backing plate to clamp the first half of the passport against the backing plate;
- an actuating mechanism that is engageable with the guide and clamp mechanism to actuate the guide and clamp mechanism to the first position;
- a processing mechanism that performs a processing operation on the passport;
- the backing plate includes an upper edge and a lower edge; and the guide and clamping mechanism is positioned adjacent to the upper edge;
- the backing plate is pivotable along the lower edge about a horizontal axis, and the backing plate is pivotable about a vertical axis; and
- the guide and clamp mechanism is movable with the backing late when the backing plate pivots about the horizontal axis and the vertical axis.

9. The passport processing mechanism of claim 8, wherein the guide and clamping mechanism is rotatably movable relative to the backing plate between the first position and the second position.

10. The passport processing mechanism of claim 8, wherein the guide and clamping mechanism is biased toward the second position.

11. The passport processing mechanism of claim 8, wherein the guide and clamping mechanism comprises at least one guide pin that faces the backing plate when the guide and clamping mechanism is in the second position, and the guide pin is biased in a direction toward the backing plate.

12. The passport processing mechanism of claim 11, wherein the guide and clamping mechanism comprises a pick that faces the backing plate when the guide and clamping mechanism is in the second position, the pick is configured to increase hold between the guide and clamping mechanism and the first half of the passport; and the guide pin projects from the guide and clamping mechanism toward the backing plate a larger distance than the pick.

13. The passport processing mechanism of claim 9, further comprising first and second stops on the backing plate at the upper edge thereof, and the first and second stops are positioned at opposite ends of the guide and clamp mechanism; and the first half of the passport is referenced against the first and second stops.

14. A passport processing mechanism configured to process a passport comprising:

a backing plate that in use supports a first half of the passport;

a platform that defines a transport path in which during use a second half of the passport is disposed;

a guide and clamp mechanism that is mounted on the backing plate for movement relative to the backing plate between a first position at which the guide and clamp mechanism is spaced from the backing plate to guide the first half of the passport and a second position at which the guide and clamp mechanism is closer to the backing plate to clamp the first half of the passport against the backing plate;

an actuating mechanism that is engageable with the guide and clamp mechanism to actuate the guide and clamp mechanism to the first position;

a processing mechanism that performs a processing operation on the passport;

the guide and clamping mechanism is rotatably movable relative to the backing plate between the first position and the second position; and the guide and clamping mechanism is also pivotable relative to the backing plate.

15. A booklet processing mechanism configured to process a booklet having a spine, comprising:

a backing plate that in use supports a first half of the booklet, the backing plate includes an upper edge and a lower edge, the backing plate is pivotally supported along the lower edge for pivoting movement about a horizontal axis, and the backing plate is pivotable about a vertical axis;

a platform mounted adjacent to the backing plate, the platform defines a transport path in which during use a second half of the booklet is disposed;

a gap formed between the platform and the backing plate that in use receives the spine of the booklet;

a first guide and clamp mechanism that is mounted on the platform that is configured and positioned to engage the first half of the booklet adjacent to the spine to bias the first half of the booklet into engagement with the backing plate;

a second guide and clamp mechanism that is mounted on the backing plate adjacent to the upper edge, the second guide and clamp mechanism is configured and positioned to engage the first half of the booklet adjacent to an upper edge thereof to bias the first half of the booklet into engagement with the backing plate;

a processing mechanism that performs a processing operation on the booklet; and a first actuating mechanism connected to the backing plate that pivots the backing plate about the horizontal axis, and a second actuating mechanism connected to the backing plate that pivots the backing plate about the vertical axis.

* * * * *